United States Patent
Han et al.

(10) Patent No.: US 9,215,029 B2
(45) Date of Patent: Dec. 15, 2015

(54) PATH SELECTING METHOD AND APPARATUS

(71) Applicant: HUAWEI TECHNOLOGIES CO., LTD., Shenzhen, Guangdong (CN)

(72) Inventors: Jianrui Han, Shenzhen (CN); Mingming Xu, Chengdu (CN); Lei Shi, Chengdu (CN); Lin Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 75 days.

(21) Appl. No.: 14/087,360

(22) Filed: Nov. 22, 2013

(65) Prior Publication Data

US 2014/0079389 A1 Mar. 20, 2014

Related U.S. Application Data

(63) Continuation of application No. PCT/CN2011/074588, filed on May 24, 2011.

(51) Int. Cl.
*H04B 10/00* (2013.01)
*H04J 14/02* (2006.01)
(Continued)

(52) U.S. Cl.
CPC ........ *H04J 14/0227* (2013.01); *H04B 10/0793* (2013.01); *H04B 10/07953* (2013.01); *H04J 14/0221* (2013.01); *H04J 14/0257* (2013.01);
(Continued)

(58) Field of Classification Search
USPC .................................................. 398/45–57
See application file for complete search history.

(56) References Cited

U.S. PATENT DOCUMENTS 8,934,768 B2 * 1/2015 Bottari et al. .................. 398/25
2003/0194234 A1 * 10/2003 Sridhar et al. ................. 398/43
(Continued)

FOREIGN PATENT DOCUMENTS

| CN | 1929690 A | 3/2007 |
| CN | 101075956 A | 11/2007 |
| CN | 101232740 A | 7/2008 |
| CN | 101662704 A | 3/2010 |

OTHER PUBLICATIONS

Bernstein, Greg M., Dan Li, Young Lee, and Giovanni Martinelli. *A Framework for the Control of Wavelength Switched Optical Networks (WSON) with Impairments*. Internet Draft Memo: Internet Engineering Task Force, Oct. 21, 2010.
(Continued)

*Primary Examiner* — Agustin Bello
(74) *Attorney, Agent, or Firm* — Staas & Halsey LLP

(57) ABSTRACT

Embodiments of the present invention disclose a path selecting method and apparatus. The method includes: computing an end-to-end path for a newly added service according to network topology and a wavelength constraint, and assigning a wavelength to the path; computing performance of each existing service and performance of the newly added service in a network according to physical impairment information collected in the network, where the physical impairment information includes a gain reference spectrum of each optical amplifier in the network; and performing impairment check on performance of each service, and performing path selection for the newly added service according to a result of the impairment check. The apparatus includes a path computation module, a performance computation module and an impairment check module. According to the embodiments, efficiency of network update or rerouting is improved.

12 Claims, 4 Drawing Sheets

(51) Int. Cl.
*H04B 10/079* (2013.01)
*H04L 12/721* (2013.01)
(52) U.S. Cl.
CPC ......... *H04J 14/0269* (2013.01); *H04J 14/0271* (2013.01); *H04L 45/62* (2013.01)

(56) References Cited

U.S. PATENT DOCUMENTS

| | | | |
|---|---|---|---|
| 2004/0208504 A1* | 10/2004 | Solheim et al. | 398/16 |
| 2006/0067686 A1* | 3/2006 | Gottwald et al. | 398/26 |
| 2009/0274464 A1* | 11/2009 | Zi et al. | 398/79 |
| 2010/0166421 A1* | 7/2010 | Hashiguchi et al. | 398/26 |
| 2010/0220996 A1* | 9/2010 | Lee et al. | 398/25 |
| 2012/0148234 A1* | 6/2012 | Bellagamba et al. | 398/28 |
| 2013/0077970 A1* | 3/2013 | Lee et al. | 398/48 |
| 2013/0156428 A1* | 6/2013 | Lee et al. | 398/49 |
| 2014/0023372 A1* | 1/2014 | Sambo et al. | 398/79 |
| 2014/0079389 A1* | 3/2014 | Han et al. | 398/26 |
| 2015/0063804 A1* | 3/2015 | Lee et al. | 398/49 |

OTHER PUBLICATIONS

International Search Report issued Mar. 8, 2012, in corresponding International Patent Application No. PCT/CN2011/074588.

Extended European Search Report issued on Jun. 27, 2014 in corresponding European Patent Application No. 11 78 2989.5.

Amir Kakekhani et al: "CRE: A novel QoT-aware routing and wavelength assignment algorithm in all-optical networks", Optical Fiber Technology, vol. 17, No. 3, Feb. 22, 2011, pp. 145-155, ZP028199160.

Azodolmolsky S et al: "A surcey on physical layer impairments aware routing and wavelength assignment algorithms in optical networks", Computer Network, Elsevier Science Publishers B.V., Amsterdam, NL, vol. 53, No. 7, May 13, 2009, pp. 926,944, XP026007938.

Pasquale Gurzi et al: "Minimum cost flow based R&WA algorithm for dispersion and OSNR limited all-optical networks", Optical Network Design and Modeling (ONDM)2011 15$^{th}$ International Conference on, IEEE, Feb. 8, 2011, pp. 106, XP031943384.

Y. Lee et al: "A Framework for the Control of Wavelength Switched Optical Networks (WSON) with Impairments; draft-ietf-ccamp-wson-impariments-07.txt", A Framework for the Control of Wavelength Switched Optical Networks (WSON) With Impairments; Draft-IETF-CCAMP-WSON-Impariments-07.Txt, Internet Engineering Task Force, IETF; Stnadardworkingdraft, Internet Society (ISOC) 4, Rue Des Falaises CH-1205 G, No. 7, Apr. 29, 2011, pp. 1-29, XP015075532.

* cited by examiner

PATH SELECTING METHOD AND APPARATUS

CROSS-REFERENCE TO RELATED APPLICATIONS

This application is a continuation of International Application No. PCT/CN2011/074588, filed on May 24, 2011, which is hereby incorporated by reference in its entirety

FIELD OF THE INVENTION

Embodiments of the present invention relate to communication technologies, and in particular, to a path selecting method and apparatus.

BACKGROUND OF THE INVENTION

A wavelength division multiplexing (Wavelength Division Multiplex, hereinafter referred to as WDM) optical network can perform, in an optical domain, multiplexing, transmission, amplification, routing, recovery and so on of a signal, and has become a focus in research of the optical communication field. According to whether a WDM optical network node performs electrical processing on an optical signal, optical networks may be classified into two types: transparent (Transparent) network and opaque (Opaque) network. For a transparent optical network, a signal is in a form of an optical signal all along a transporting process from a source node to a sink node, and regeneration, switching and wavelength transformation of the signal are completed in the optical domain. Because a node does not have a regeneration capability of an electrical signal, the transparent optical network is essentially an analog transport network. Therefore, signal impairment and various harmful physical effects such as crosstalk, non-linearity, and dispersion cannot be eliminated in the transporting process. Accumulation of noise is continuous and analog, and quality of the signal which finally reaches the sink node is related to the noise introduced in the entire transporting process. Moreover, some physical impairment not only influences wavelength performance of a local channel, but may also impose impact on wavelength performance of another channel. Therefore, when an optical path connection is established in the WDM optical network, it is very meaningful to fully consider the physical effects that have negative influence on the quality of the signal, such as the physical impairment.

In the prior art, a simple principle is generally adopted to avoid the foregoing problem, that is, performing wavelength assignment from two sides to the middle in a scenario of mixed-rate transmission of 10 G/40 G services. For example, for a wavelength division network of a 40-wave system, assignment starts from $\lambda_1$ for a 10 G service, while assignment starts from $\lambda_{40}$ for a 40 G service. In other scenarios, there is still no better method to solve the problem.

However, the prior art has at least the following disadvantages: The mutual influence of service performance between different wavelengths is not fully considered, so that during expansion of a newly established service, a bit error or even service interruption occurs in a channel with an activated service.

SUMMARY OF THE INVENTION

Embodiments of the present invention are to provide a path selecting method and apparatus, to fully consider the mutual influence of service performance between different wavelengths and improve efficiency of network update or rerouting.

To achieve the foregoing objectives, an embodiment of the present invention provides a path selecting method, including:

computing an end-to-end path for a newly added service according to network topology and a wavelength constraint, and assigning a wavelength to the path;

computing performance of each existing service and performance of the newly added service in a network according to physical impairment information collected in the network, where the physical impairment information includes a gain reference spectrum of each optical amplifier in the network; and performing impairment check on performance of each service, and performing path selection for the newly added service according to a result of the impairment check.

An embodiment of the present invention provides a path selecting apparatus, including:

a path computation module, configured to compute an end-to-end path for a newly added service according to network topology and a wavelength constraint, and assign a wavelength to the path;

a performance computation module, configured to compute performance of each existing service and performance of the newly added service in a network according to physical impairment information collected in the network, where the physical impairment information includes a gain reference spectrum of each optical amplifier in the network; and an impairment check module, configured to perform impairment check on performance of each service, and perform path selection for the newly added service according to a result of the impairment check.

According to the path selecting method and apparatus provided in the embodiments of the present invention, the end-to-end path is computed for the newly added service without considering the physical impairment information first; on the basis that the path is added in the network, performance of each existing service and performance of the newly added service are computed according to the physical impairment information that is collected in the network and influences performance of each service; and impairment check is performed on performance of each service, and the path is selected for the newly added service according to a result of the impairment check. In the embodiments, the mutual influence of service performance between different wavelengths is fully considered, disadvantages in the prior art such as a channel error of an existing service caused due to not consideration of physical impairment are avoided, and the efficiency of network update or rerouting is improved.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description are some embodiments of the present invention, and a person of ordinary skill in the art may still derive other drawings from these accompanying drawings without making creative efforts.

DETAILED DESCRIPTION OF THE EMBODIMENTS

To make the objectives, technical solutions, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without making creative efforts shall fall within the protection scope of the present invention.

Figure 1:
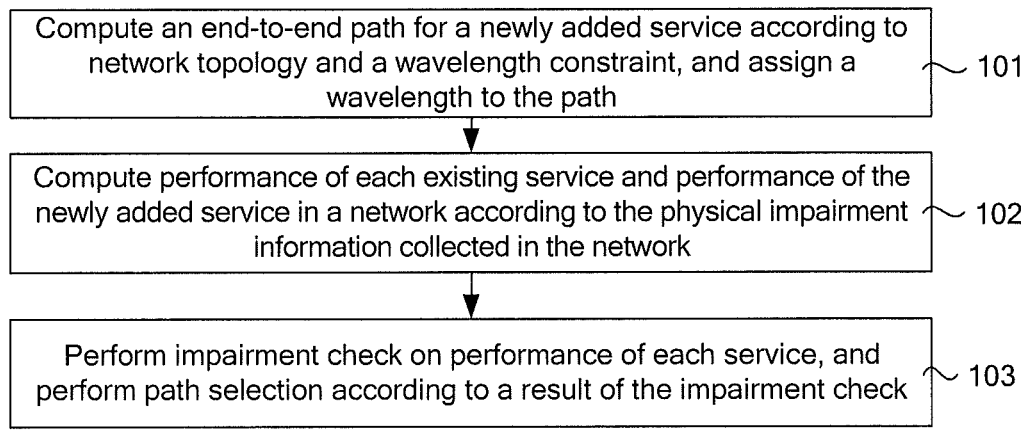
FIG. 1 is a flow chart of a first embodiment of a path selecting method according to the present invention.

FIG. 1 is a flow chart of a first embodiment of a path selecting method according to the present invention. As shown in FIG. 1, this embodiment provides a path selecting method, which may specifically include the following steps:

Step 101: Compute an end-to-end path for a newly added service according to network topology and a wavelength constraint, and assign a wavelength to the path.

In this embodiment, when a newly added service appears, a path needs to be assigned to the newly added service in a network. Specifically, an end-to-end path may be first computed for the newly added service according to a current network topology situation and a wavelength constraint. The end-to-end here is specifically from a source node of the newly added service to a sink node of the newly added service. Meanwhile, a wavelength is assigned to the path obtained by the computation. In this step, during computing of the end-to-end path, physical impairment information is not considered first, and persons skilled in the art may specifically refer to computation architecture described in the reference document [*A Framework for the Control of Wavelength Switched Optical Networks (WSON) with Impairments* Y. Lee, G. Bernstein., etc. work in progress], where an impairment aware route and wavelength assignment (Impairment Aware Route and Wavelength Assignment, hereinafter referred to as IA-RWA) algorithm is described, that is, computing an end-to-end path without considering physical impairment information and assigning a corresponding wavelength to the path.

Step 102: Compute performance of each existing service and performance of the newly added service in a network according to the physical impairment information collected in the network.

In this embodiment, when a path is selected for the newly added service, the mutual influence of performance between different services is taken into consideration, which is implemented by collecting the physical impairment information that is in the network and influences the performance. An optical amplifier here may specifically be an erbium doped fiber amplifier (Erbium Doped Fiber Amplifier, hereinafter referred to as EDFA). Specifically, the physical impairment information in this embodiment may include a gain reference spectrum of each optical amplifier, optical power of each channel, an optical fiber type, and a wavelength occupation status of each channel. It should be noted that in this embodiment, one service corresponds to one end-to-end path, and one wavelength is correspondingly assigned to one path, so the service corresponds to the wavelength, and performance of the service also corresponds to performance of the wavelength. Specifically, causes of the mutual influence of the performance between different services currently include: unflat gains of the EDFA for different services, and competition between gains of different services, that is, after a new service is added, a gain of another service on a same link may change, and further performance of the service may change. In this embodiment, it may specifically be that a path computation element collects the physical impairment information in the network, or that each node actively sends the physical impairment information to a path computation element.

Specifically, the method provided in the embodiment may further include the following step: Re-obtain updated optical power of each channel when optical power of each channel in physical impairment information changes, or receive updated optical power of each channel that is actively sent by each node in the network. In the foregoing physical impairment information, a gain reference spectrum of each optical amplifier is a static parameter, while optical power of each channel is a dynamic parameter. For the dynamic parameter, when the parameter changes, a path computation element needs to re-obtain updated data, or each node actively sends updated data to a path computation element.

This step may specifically be that the path computation element computes performance of each existing service and performance of the newly added service in the network according to each piece of physical impairment information collected in the network. In the embodiment, when a path is selected for the newly added service, each piece of the physical impairment information that influences the performance between different services is taken into consideration to compute performance of each existing service and performance of the newly added service according to the physical impairment information after the new service is added in the network, so as to acquire the influence on performance of another existing service after the newly added service in the foregoing steps is added in the network.

Step 103: Perform impairment check on performance of each service, and perform path selection according to a result of the impairment check.

After performance of each existing service and performance of the newly added service are obtained by computation, impairment check is performed on performance of each service, which may specifically be: determining whether computed performance of each service can meet a preset performance requirement, and generating a result of the impairment check. If the generated result of the impairment check is that performance of each service can meet the preset performance requirement, the path obtained by the computation in step 101 is used as a path selected for the newly added service; otherwise, the foregoing steps 101 to 103 are repeated until performance of each service obtained according to a path obtained by computation can meet the preset performance requirement.

According to the path selecting method provided in this embodiment, the end-to-end path is computed for the newly added service without considering the physical impairment information first; on the basis that the path is added in the network, performance of each existing service and performance of the newly added service are computed according to the physical impairment information that influences performance of each service and is collected in the network; and the impairment check is performed on performance of each service, and a path is selected for the newly added service according to the result of the impairment check. In this embodiment, the mutual influence of service performance between different wavelengths is fully considered, disadvantages in the prior art, such as the negative impact on performance of the existing services caused due to not consideration of physical impairment, are avoided; meanwhile, the possible impact caused by the existing services on the newly added service is considered in advance, efficiency of network update or rerouting is improved, and path recomputation caused by failing to activate a service is avoided.

Figure 2A:
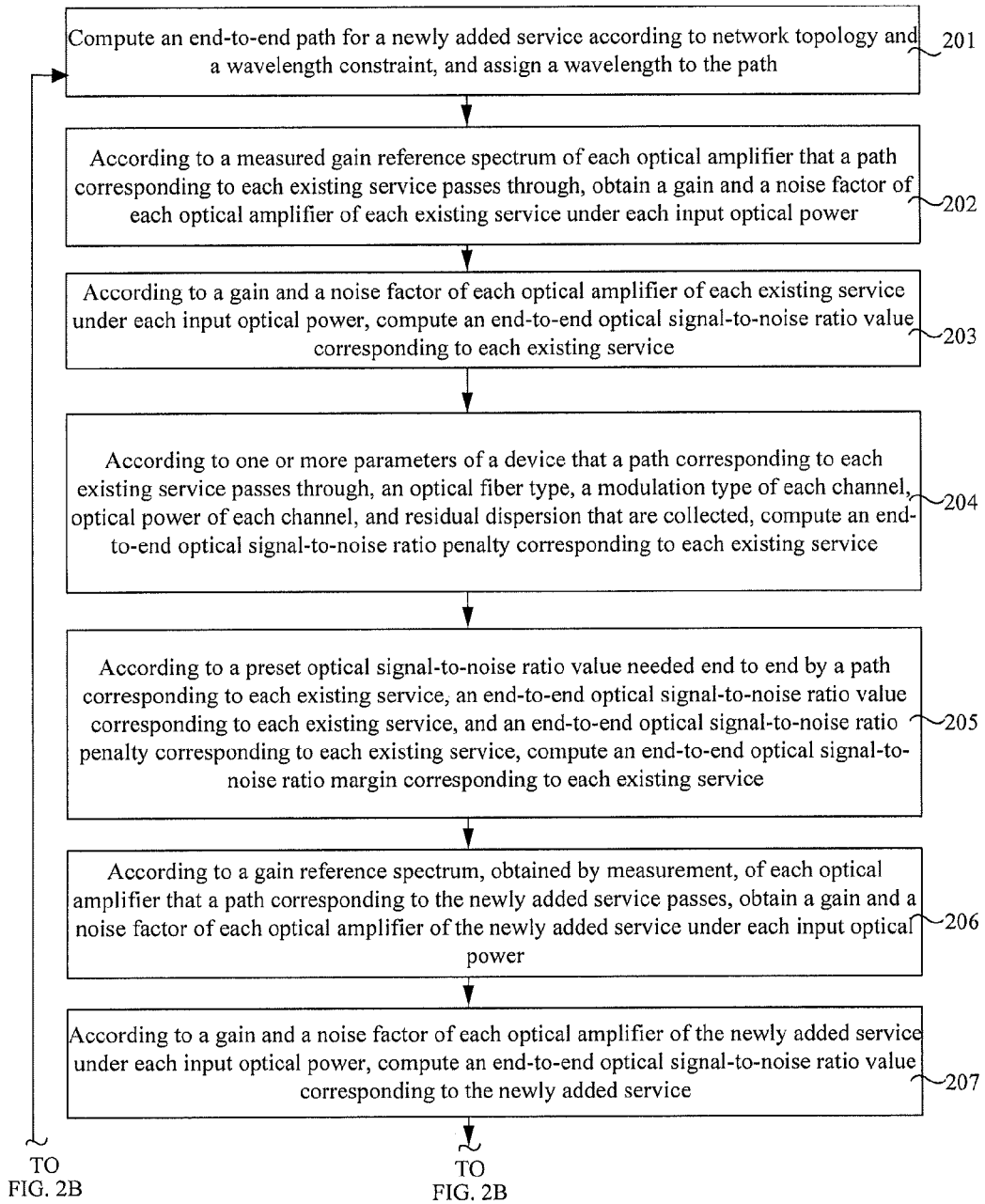
FIG. 2A and FIG. 2B are a flow chart of a second embodiment of a path selecting method according to the present invention.
Figure 2B:
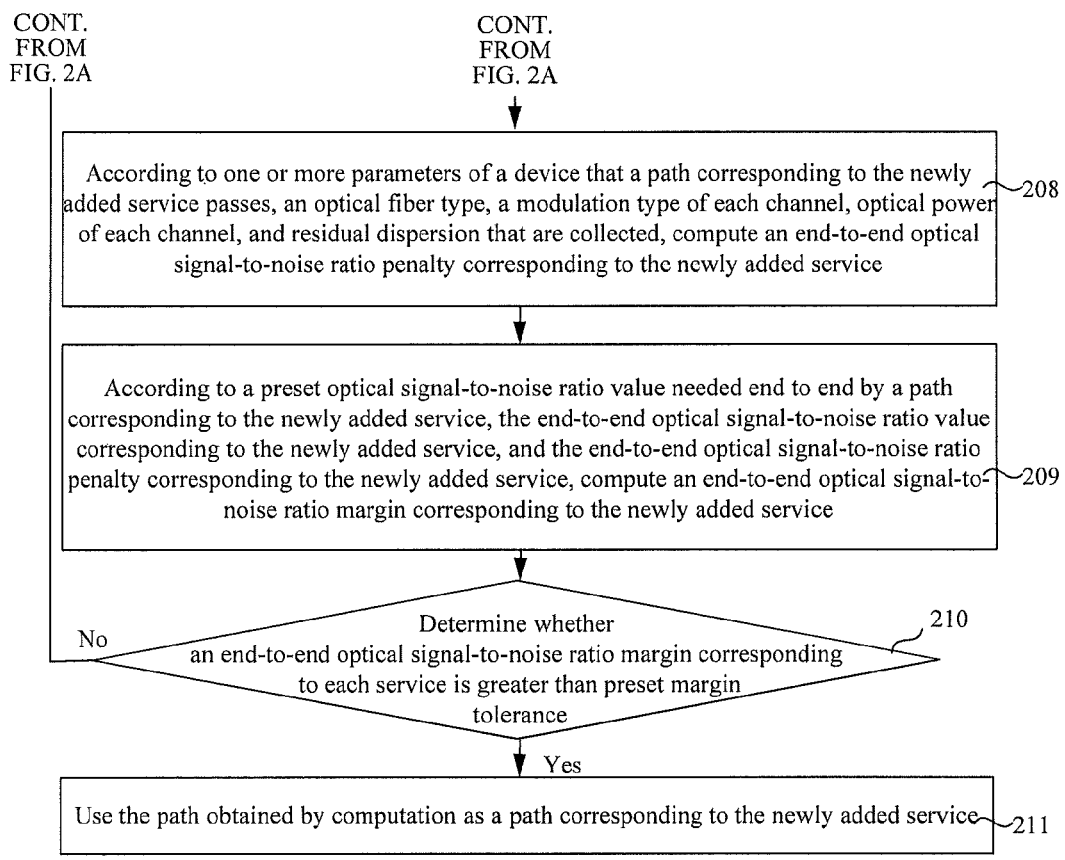

FIG. 2A and FIG. 2B are a flow chart of a second embodiment of a path selecting method according to the present invention. As shown in FIG. 2A and FIG. 2B, this embodiment provides a path selecting method, which may specifically includes the following steps:

Step 201: Compute an end-to-end path for a newly added service according to network topology and a wavelength constraint, and assign a wavelength to the path.

Figure 3:
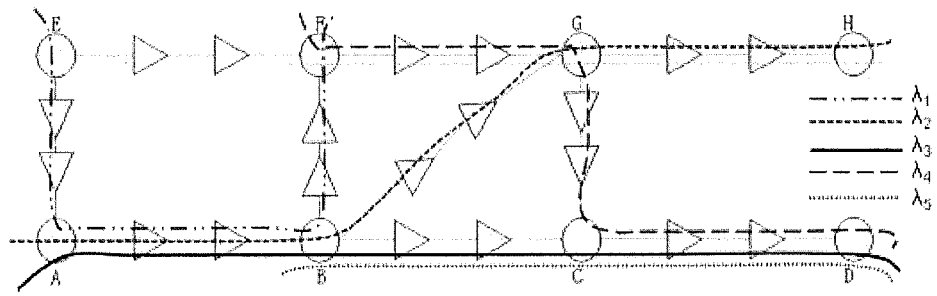
FIG. 3 is a schematic diagram of a path corresponding to each service in the second embodiment of the path selecting method according to the present invention.

FIG. 3 is a schematic diagram of a path corresponding to each service in the second embodiment of the path selecting method according to the present invention. As shown in FIG. 3, a network includes eight nodes: A, B, C, D, E, F, G, and H. Assuming that there are four services activated in the network, wavelengths corresponding to the existing services are $\lambda_1$, $\lambda_2$, $\lambda_4$ and $\lambda_5$, respectively; and their corresponding paths are EABF, ABGH, FGCD and BCD, respectively. In this embodiment, a node that each service passes is used to indicate a path corresponding the service. In this embodiment, assuming that a user intends to add, on the basis of an existing network, a new service whose source node is A and whose sink node is D. In this step, physical impairment information is not considered first, and an end-to-end path is computed for the newly added service according to the current network topology and wavelength constraint. Specifically, an existing method of centralized path computation is adopted, which may specifically be that a centralized path computation element (Path Computation Element, hereinafter referred to as PCE) is responsible for path computation. A path computation method of the PCE may specifically adopt an existing computation method, for example, by using an existing wavelength route assignment algorithm, the PCE selects a path for a service and assigns a wavelength, and details are not repeated herein. Assuming that a path computed for the newly added service is ABGCD, and a wavelength assigned to it is $\lambda_3$, for example, the wavelength may be assigned according to an existing RWA algorithm.

Step 202: According to a measured gain reference spectrum of each optical amplifier that a path corresponding to each existing service passes through, obtain a gain and a noise factor of each optical amplifier of each existing service under each input optical power after the new service is added in the network.

In this embodiment, after the PCE computes an end-to-end path for the newly added service, first assuming that the path is added in the network, the physical impairment information in the current network, such as a gain reference spectrum of each optical amplifier, optical power information of each channel, and a wavelength occupation status of each channel, is collected. An optical amplifier in this embodiment may specifically be an EDFA. In this step, a gain reference spectrum of an EDFA that a path corresponding to each existing service passes through may specifically be obtained by measuring gains and noise factors of multiple channels by using an instrument such as an optical spectrum analyser, where there may specifically be 40 channels in a 40-wave system. Here an obtained gain reference spectrum of each EDFA refers to a gain and a noise factor of each channel under typical input optical power and a typical average gain, for example, a typical average gain of a certain type of EDFA is 20 dB, and typical input optical power is −20 dBm. Persons skilled in the art may obtain a new gain and a new noise factor under any other input optical power and any wavelength distribution (for example, a combination of several wavelengths in 40 wavelengths) based on the gain reference spectrum and mathematical modeling of an EDFA board or engineering experience, so as to obtain an optical power level output by the EDFA at any input optical power level under any wavelength distribution in a precondition of a given average gain. A wavelength distribution situation may specifically be obtained through a wavelength occupation status of each channel. Input optical power of a first-section optical amplifier corresponding to each existing service is input optical power of a first-section optical amplifier of each existing service before the new service is added in the network, that is, after the new service is added in the network, input optical power of a first-section optical amplifier corresponding to each existing service does not change, where the input optical power is power of a single channel of each existing service other than total input optical power of the optical amplifiers. Input optical power of an optical amplifier of each section is obtained according to output optical power of an optical amplifier of a previous section, attenuation between optical amplifiers of two sections and the Raman effect of the optical fiber between optical amplifiers of two sections.

Step 203: According to a gain and a noise factor of each optical amplifier of each existing service under each input optical power, compute an end-to-end optical signal-to-noise ratio value corresponding to each existing service after the new service is added in the network.

After a gain and a noise factor of each EDFA of each existing service under each input optical power are obtained according to the foregoing step, an end-to-end optical signal-to-noise ratio (Optical Signal Noise Ratio, hereinafter referred to as OSNR) value corresponding to each existing service may be obtained by computation. For each EDFA, when an input optical power level of each channel and a gain and a noise factor of the EDFA under the input optical power are known, an OSNR value passing the EDFA may be obtained by computation. However, input optical power of an EDFA of each section is obtained according to output optical power of an EDFA of a previous section, attenuation between EDFAs of two sections and the Raman effect of the optical fiber between EDFAs of two sections. Therefore, output optical power of an EDFA of each section which a path corresponding to a service passes is computed in sequence according to the foregoing method, and finally an OSNR value of the channel reaching a sink node after passing multiple sections of EDFAs is obtained by computation, that is, the end-to-end OSNR value corresponding to the service is obtained.

Step 204: According to one or more parameters of a device that a path corresponding to each existing service passes through, an optical fiber type, a modulation type of each channel, optical power of each channel, and residual dispersion that are collected, compute an end-to-end optical signal-to-noise ratio penalty corresponding to each service.

In this step, the PCE collects one or more device parameters of another device that a path corresponding to each existing service passes through, an optical fiber type, a modulation type of each channel, optical power of each channel, residual dispersion and so on, and based on this, computes an end-to-end OSNR penalty corresponding to each existing service. Persons skilled in the art may specifically obtain a corresponding OSNR penalty by computation according to their engineering design experience or modeling of another device and an optical fiber channel that each path passes. The following may be taken into consideration for the optical signal-to-noise ratio penalty: one or more of multiple linear impairment factors, such as chromatic dispersion (Chromatic Dispersion, hereinafter referred to as CD), polarization mode dispersion (Polarization Mode Dispersion, hereinafter referred to as PMD), crosstalk (Crosstalk, hereinafter referred to as Xtalk), and filter cascade, and one or more of multiple non-linear impairment factors, such as self phase modulation (Self Phase Modulation, hereinafter referred to as SPM), cross-phase modulation (Cross-Phase Modulation, hereinafter referred to as XPM), four-wave mixing (Four-Wave Mixing, hereinafter referred to as FWM), stimulated Brillouin scattering (Stimulated Brillouin Scattering, hereinafter referred to as SBS), and stimulated Raman scattering (Stimulated Raman Scattering, hereinafter referred to as SRS), where the multiple non-linear impairment factors correspond to a CD optical signal-to-noise ratio penalty, a PMD optical signal-to-noise ratio penalty, an Xtalk optical signal-to-noise ratio penalty and so on, and the multiple non-linear impairment factors correspond to an SPM optical signal-to-noise ratio penalty, an XPM optical signal-to-noise ratio penalty, an FWM optical signal-to-noise ratio penalty and so on. Here, the end-to-end optical signal-to-noise ratio penalty corresponding to the service is the sum of these penalties. Therefore, in this embodiment, non-linear factors are taken into consideration for service performance, which may overcome disadvantages such as channel performance deterioration caused by a non-linear effect in an existing optical network.

Step 205: According to a preset optical signal-to-noise ratio value needed end to end by a path corresponding to each existing service, an end-to-end optical signal-to-noise ratio value corresponding to each existing service, and an end-to-end optical signal-to-noise ratio penalty corresponding to each existing service, compute an end-to-end optical signal-to-noise ratio margin corresponding to each existing service.

After an end-to-end OSNR value and an OSNR penalty which correspond to each existing service are obtained by computation in the foregoing step, an end-to-end OSNR margin corresponding to each existing service is computed according to a preset OSNR value needed end to end. Specifically, the following formula may be adopted for computation: end-to-end OSNR margin=OSNR value needed end to end–end-to-end OSNR value–end-to-end OSNR penalty. The OSNR value needed end to end may be a determined value obtained by measurement in advance or preset by a user according to practical experience. In this embodiment, an end-to-end OSNR margin corresponding to each service is used as a parameter for evaluating performance of each service. The larger the OSNR margin is, the better the performance of the service is. Respective end-to-end OSNR margins corresponding to services $\lambda_1$, $\lambda_2$, $\lambda_4$ and $\lambda_5$ may be obtained by computation according to the foregoing steps 202 to 205, that is, performance of the services $\lambda_1$, $\lambda_2$, $\lambda_4$ and $\lambda_5$ is obtained. In this embodiment, that the OSNR margin is used as the parameter for evaluating performance of each service is taken as an example for illustration. Persons skilled in the art may understand that an OSNR value, an OSNR penalty value or another parameter value may also be adopted as a standard for evaluating service performance. For example, when the OSNR value is adopted, OSNR tolerance may be preset accordingly, and in this case, steps 204 and 205 do not need to be performed. Subsequently, the OSNR value and the OSNR tolerance that are computed above are compared, and impairment check is performed on service performance according to a comparison result. It is similar for another parameter value, and details are not repeated here.

Step 206: According to a gain reference spectrum, obtained by measurement, of each optical amplifier that a path corresponding to the newly added service passes, obtain a gain and a noise factor of each optical amplifier of the newly added service under each input optical power.

While computing performance of the existing services $\lambda_1$, $\lambda_2$, $\lambda_4$ and $\lambda_5$, the PCE also computes performance of the newly added service $\lambda_3$, that is, computes an end-to-end OSNR margin corresponding to the newly added service $\lambda_3$, the step of which is a process of computing the performance of the newly added service $\lambda_3$. There is no absolute time sequence limitation relationship between steps 206 to 209 and steps 202 to 205. Steps 206 to 209 may also be performed first, and the two may also be performed simultaneously. In this step, when an end-to-end OSNR value of the newly added service $\lambda_3$ is computed, because the newly added service $\lambda_3$ is not activated yet, a gain and a noise factor of each EDFA that the path corresponding to the newly added service passes may be specifically obtained according to the gain reference spectrum. Input optical power of a first-section optical amplifier corresponding to the newly added service is a preset optical power value or the average of input optical power of first-section optical amplifiers of the existing services, and input optical power of an optical amplifier of each section is obtained according to output optical power of an optical amplifier of a previous section, attenuation between optical amplifiers of two sections and the Raman effect of the optical fiber between the optical amplifiers of two sections. That is, because the newly added service is not actually added in the network, its input optical power may be a preset typical optical power level. The typical optical power level may be set according to practical engineering experience, or may be a mean optical power level of other services that are activated on the node.

Step 207: According to a gain and a noise factor of each optical amplifier of the newly added service under each input optical power, compute an end-to-end optical signal-to-noise ratio value corresponding to the newly added service.

The end-to-end OSNR value corresponding to the newly added service is computed according to a gain and a noise factor, obtained in the foregoing step, of each EDFA that the path corresponding to the newly added service passes. Reference may be made to the foregoing process of computing an end-to-end OSNR value corresponding to each existing service for a specific computation method, and details are not repeated herein.

Step 208: According to one or more parameters of a device that the path corresponding to the newly added service passes, an optical fiber type, a modulation type of each channel, optical power of each channel, and residual dispersion that are collected, compute an end-to-end optical signal-to-noise ratio penalty corresponding to the newly added service. This step may be similar to the foregoing step 204, and details are not repeated here.

Step 209: According to a preset optical signal-to-noise ratio value needed end to end by a path corresponding to the newly added service, the end-to-end optical signal-to-noise ratio value corresponding to the newly added service, and the end-to-end optical signal-to-noise ratio penalty corresponding to the newly added service, compute an end-to-end optical signal-to-noise ratio margin corresponding to the newly added service. This step may be similar to the foregoing step 205, and details are not repeated here.

Step 210: Determine whether an end-to-end optical signal-to-noise ratio margin corresponding to each service is greater than preset margin tolerance. If yes, perform step 211; otherwise, repeat step 201 until a path obtained by re-computation satisfies the preset margin tolerance.

After performance of each existing service and performance of the newly added service are obtained by computation in the foregoing steps, that is, after an end-to-end OSNR margin corresponding to each existing service and an end-to-end OSNR margin corresponding to the newly added service are obtained by computation, impairment check is performed on performance of each service. Specifically, whether an end-to-end OSNR margin corresponding to each service is greater than the preset margin tolerance is determined. If yes, perform step 211; otherwise, when an end-to-end optical signal-to-noise ratio margin corresponding to at least one service is smaller than the preset margin tolerance, repeat step 201, that is, recompute an end-to-end path for the newly added service, and repeat steps 202 to 210 until the path obtained by the re-computation satisfies the preset margin tolerance.

Based on the end-to-end path ABGCD computed for the newly added service $\lambda_3$ in the foregoing step, if the end-to-end OSNR margins which correspond to the existing services $\lambda_1$, $\lambda_2$, $\lambda_4$ and $\lambda_5$ and the newly added service $\lambda_3$ and are obtained by computation by the PCE according to the collected physical impairment information are 1, −1, 1, 0.5 and 1, respectively, and the preset margin tolerance is 0, then because the end-to-end OSNR margin corresponding to the service $\lambda_2$ is smaller than 0, the path ABGCD cannot meet a performance requirement. Return to perform step 201. If an end-to-end path ABCD is recomputed for the newly added service $\lambda_3$ in step 201, and the end-to-end OSNR margins which correspond to the existing services $\lambda_1$, $\lambda_2$, $\lambda_4$ and $\lambda_5$ and the newly added service $\lambda_3$ and are obtained by computation by the PCE according to the collected physical impairment information are 1, 1.2, 2, 0.5 and 2, respectively, which are all greater than 0, the path ABCD may meet the performance need. Then, perform step 211.

Step 211: Use the path obtained by the computation as a path corresponding to the newly added service.

Through impairment check performed on performance of each service in the foregoing step, when an end-to-end optical signal-to-noise ratio margin corresponding to each service is greater than the preset margin tolerance, it indicates that the path obtained by the computation in step 201 may meet the preset performance requirement, then the path is used as a path corresponding to the newly added service $\lambda_3$.

According to the path selecting method provided in this embodiment, the end-to-end path is computed for the newly added service without considering the physical impairment information first; on the basis that the path is added in the network, performance of each existing service and performance of the newly added service are computed according to the physical impairment information that influences performance of each service and is collected in the network; and impairment check is performed on performance of each service, and the path is selected for the newly added service according to a result of the impairment check. In this embodiment, the mutual influence of service performance between different wavelengths is fully considered, and during path selection in this embodiment, whether the performance of the new service meets the performance requirement is determined, and whether the newly added path influences the existing services is determined at the same time, so as to avoid the possible negative impact on the existing services, and meanwhile possible impact caused by the existing services on the newly added service is considered in advance. Efficiency of network update or rerouting is improved, which avoids path recomputation caused by failing to activate a service.

A person of ordinary skill in the art may understand that all or part of the steps in the foregoing method embodiments may be completed by a program instructing relevant hardware. The program may be stored in a computer readable storage medium or a readable storage medium built in an optical layer device. When the program is run, the steps in the foregoing method embodiments are performed. The storage medium includes any medium that is capable of storing program codes, such as a ROM, a RAM, a magnetic disk, or a compact disk.

Figure 4:
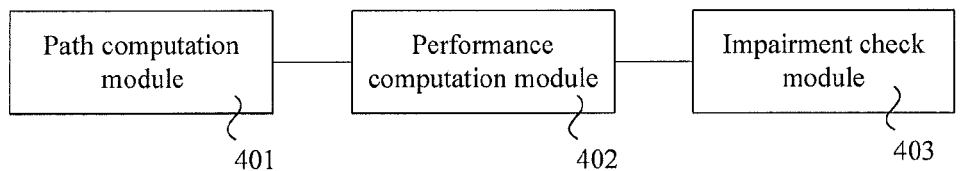
FIG. 4 is a structural diagram of a first embodiment of a path selecting apparatus according to the present invention.

FIG. 4 is a structural diagram of a first embodiment of a path selecting apparatus according to the present invention. As shown in FIG. 4, this embodiment provides a path selecting apparatus, which may perform each step in the foregoing first method embodiment, and details are not repeated here. The path selecting apparatus provided in this embodiment may specifically include a path computation module 401, a performance computation module 402 and an impairment check module 403. The path computation module 401 is configured to compute an end-to-end path for a newly added service according to network topology and a wavelength constraint, and assign a wavelength to the path. The performance computation module 402 is configured to compute performance of each existing service and performance of the newly added service in a network according to physical impairment information collected in the network, where the physical impairment information includes a gain reference spectrum of each optical amplifier in the network. The impairment check module 403 is configured to perform impairment check on performance of each service, and perform path selection for the newly added service according to a result of the impairment check.

Figure 5:
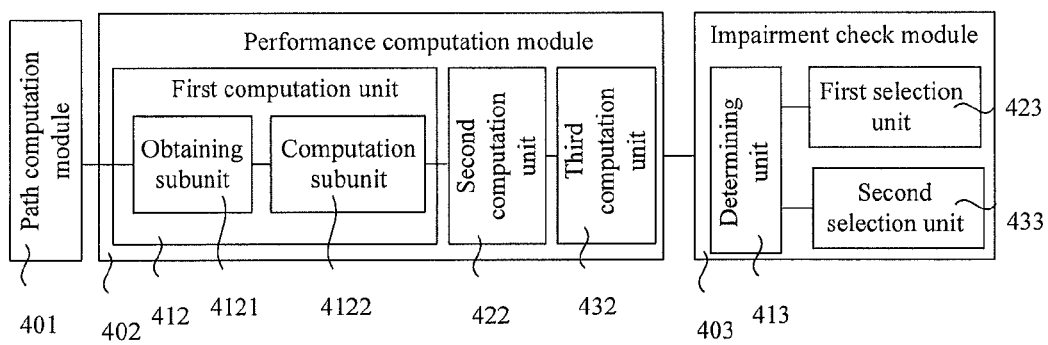
FIG. 5 is a structural diagram of a second embodiment of a path selecting apparatus according to the present invention.

FIG. 5 is a structural diagram of a second embodiment of a path selecting apparatus according to the present invention. As shown in FIG. 5, this embodiment provides a path selecting apparatus, which may perform each step in the foregoing second method embodiment, and details are not repeated here. On the basis of what is shown in FIG. 4, in the path selecting apparatus provided in this embodiment, the performance computation module 402 may specifically include a first computation unit 412. The first computation unit 412 is configured to: according to a measured gain reference spectrum and collected optical power of each optical amplifier that a path corresponding to each existing service and the newly added service passes, compute an end-to-end optical signal-to-noise ratio value corresponding to each existing service and an end-to-end optical signal-to-noise ratio value corresponding to the newly added service after the new service is added in the network.

Further, the performance computation module 402 in the path selecting apparatus provided in this embodiment may further include a second computation unit 422. The second computation unit 422 is configured to: according to a parameter of a device that a path corresponding to each existing service and the newly added service passes, an optical fiber type, a modulation type of each channel, optical power of each channel, and residual dispersion that are collected, compute an end-to-end optical signal-to-noise ratio penalty corresponding to each existing service and an end-to-end optical signal-to-noise ratio penalty corresponding to the newly added service.

Further, the performance computation module 402 in the path selecting apparatus provided in this embodiment may further include a third computation unit 432. The third computation unit 432 is configured to: according to a preset optical signal-to-noise ratio value needed end to end by a path corresponding to each existing service and the newly added service, an end-to-end optical signal-to-noise ratio value corresponding to each existing service and an end-to-end optical signal-to-noise ratio value corresponding to the newly added service, and an end-to-end optical signal-to-noise ratio penalty corresponding to each existing service and an end-to-end optical signal-to-noise ratio penalty corresponding to the newly added service, compute an end-to-end optical signal-to-noise ratio margin corresponding to each existing service and an end-to-end optical signal-to-noise ratio margin corresponding to the newly added service, and use an end-to-end optical signal-to-noise ratio margin corresponding to each service as a parameter for evaluating performance of each service.

Further, the first computation unit 412 may specifically include an obtaining subunit 4121 and a computation subunit 4122. The obtaining subunit 4121 is configured to: according to a gain reference spectrum, obtained by measurement, of each optical amplifier that a path corresponding to each existing service and the newly added service passes, obtain respective gains and noise factors of optical amplifiers of each existing service and the newly added service under each input optical power. The computation subunit 4122 is configured to: according to the respective gains and noise factors of the optical amplifiers of each existing service and the newly added service under each input optical power, compute an end-to-end optical signal-to-noise ratio value corresponding to each existing service and an end-to-end optical signal-to-noise ratio value corresponding to the newly added service after the new service is added in the network, where input optical power of a first-section optical amplifier corresponding to each existing service is input optical power of a first-section optical amplifier of each existing service before the new service is added in the network, input optical power of a first-section optical amplifier corresponding to the newly added service is a preset optical power value or the average of input optical power of first-section optical amplifiers of the existing services, and input optical power of an optical amplifier of each section is obtained according to output optical power of an optical amplifier of a previous section, attenuation between optical amplifiers of two sections and the Raman effect of an the optical fiber between the optical amplifiers of two sections.

Further, the impairment check module 403 may specifically include a determining unit 413, a first selection unit 423, and a second selection unit 433. The determining unit 413 is configured to determine whether an end-to-end optical signal-to-noise ratio margin corresponding to each service is greater than preset margin tolerance. The first selection unit 423 is configured to: when an end-to-end optical signal-to-noise ratio margin corresponding to each service is greater than the preset margin tolerance, use the path obtained by the computation as a path corresponding to the newly added service. The second selection unit 433 is configured to: when an end-to-end optical signal-to-noise ratio margin corresponding to at least one service is smaller than the preset margin tolerance, repeat the step of computing an end-to-end path for the newly added service according to the network topology and the wavelength constraint until the path obtained by re-computation satisfies the preset margin tolerance.

According to the path selecting apparatus provided in this embodiment, the end-to-end path is computed for the newly added service without considering the physical impairment information first; on the basis that the path is added in the network, performance of each existing service and performance of the newly added service are computed according to the physical impairment information that influences performance of each service and is collected in the network; and impairment check is performed on performance of each service, and the path is selected for the newly added service according to a result of the impairment check. In this embodiment, the mutual influence of service performance between different wavelengths is fully considered, and during path selection in this embodiment, whether the performance of the new service meets the performance requirement is determined, and whether the newly added path influences the existing services is determined at the same time, so as to avoid the possible negative impact on the existing services, and meanwhile the possible impact caused by the existing services on the newly added service is considered in advance. Efficiency of network update or rerouting is improved, which avoids path recomputation caused by failing to activate a service.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they can still make modifications to the technical solutions described in the foregoing embodiments or make equivalent substitutions to part of the technical features; however, these modifications or substitutions do not make the essence of the corresponding technical solutions depart from the idea and scope of the technical solutions of the embodiments of the present invention.

What is claimed is:

1. A path selecting method, comprising:
   computing an end-to-end path for a newly added service according to network topology and a wavelength constraint, and assigning a wavelength to the path;
   computing performance of each existing service and performance of the newly added service in a network according to physical impairment information collected in the network, wherein the physical impairment information comprises a gain reference spectrum of each optical amplifier in the network; and
   performing an impairment check on performance of each service, and performing path selection for the newly added service according to a result of the impairment check;
   wherein the performing impairment check on performance of each service, and performing path selection for the newly added service according to a result of the impairment check includes:
   determining whether computed performance of each service can meet a preset performance requirement, and generating a result of the impairment check;
   if the generated result of the impairment check is that performance of each service can meet the preset performance requirement, the path obtained by the computation is used as the path selected for the newly added service;
   otherwise, repeat the computing an end-to-end path for the newly added service, computing performance of each existing service and performance of the newly service, and performing impairment check on performance of each service, until performance of each service obtained can meet the preset performance requirement.

2. The method according to claim 1, wherein the computing performance of each existing service and performance of the newly added service in a network according to physical impairment information collected in the network comprises:

according to a measured gain reference spectrum and collected input optical power of each optical amplifier that a path corresponding to each existing service and the newly added service passes, computing an end-to-end optical signal-to-noise ratio value corresponding to each existing service and an end-to-end optical signal-to-noise ratio value corresponding to the newly added service after the new service is added in the network, and using an end-to-end optical signal-to-noise ratio value corresponding to each service as a parameter for evaluating performance of each service.

3. The method according to claim 1, wherein the computing performance of each existing service and performance of the newly added service in a network according to physical impairment information collected in the network further comprises:

according to one or more parameters of a device that a path corresponding to each existing service and the newly added service passes, an optical fiber type, a modulation type of each channel, optical power of each channel, and residual dispersion that are collected, computing an end-to-end optical signal-to-noise ratio penalty corresponding to each existing service and an end-to-end optical signal-to-noise ratio penalty corresponding to the newly added service, and using an end-to-end optical signal-to-noise ratio penalty corresponding to each service as a parameter for evaluating performance of each service.

4. The method according to claim 3, wherein the computing performance of each existing service and performance of the newly added service in a network according to physical impairment information collected in the network further comprises:

according to a preset optical signal-to-noise ratio value needed end to end by a path corresponding to each existing service and the newly added service, an end-to-end optical signal-to-noise ratio value corresponding to each existing service and an end-to-end optical signal-to-noise ratio value corresponding to the newly added service, and an end-to-end optical signal-to-noise ratio penalty corresponding to each existing service and an end-to-end optical signal-to-noise ratio penalty corresponding to the newly added service, computing an end-to-end optical signal-to-noise ratio margin corresponding to each existing service and an end-to-end optical signal-to-noise ratio margin corresponding to the newly added service, and using an end-to-end optical signal-to-noise ratio margin corresponding to each service as a parameter for evaluating performance of each service.

5. The method according to claim 2, wherein the according to a measured gain reference spectrum and collected input optical power of each optical amplifier that a path corresponding to each existing service and the newly added service passes, computing an end-to-end optical signal-to-noise ratio value corresponding to each existing service and an end-to-end optical signal-to-noise ratio value corresponding to the newly added service after the new service is added in the network comprises:

according to a measured gain reference spectrum of each optical amplifier that a path corresponding to each existing service and the newly added service passes, obtaining respective gains and noise factors of optical amplifiers of each existing service and the newly added service under each input optical power after the new service is added in the network; and according to the respective gains and noise factors of the optical amplifiers of each existing service and the newly added service under each input optical power, computing an end-to-end optical signal-to-noise ratio values corresponding to each existing service and an end-to-end optical signal-to-noise ratio value corresponding to the newly added service after the new service is added in the network, wherein input optical power of a first-section optical amplifier corresponding to each existing service is input optical power of the first-section optical amplifier of each existing service before the new service is added in the network, input optical power of a first-section optical amplifier corresponding to the newly added service is a preset optical power value or an average of input optical power of first-section optical amplifiers of the existing services, and input optical power of an optical amplifier of each section is obtained according to output optical power of an optical amplifier of a previous section, attenuation between optical amplifiers of two sections and a Raman effect of an optical fiber between the optical amplifiers of two sections.

6. A path selecting method, comprising:

computing an end-to-end path for a newly added service according to network topology and a wavelength constraint, and assigning a wavelength to the path;

computing performance of each existing service and performance of the newly added service in a network according to physical impairment information collected in the network, wherein the physical impairment information comprises a gain reference spectrum of each optical amplifier in the network; and performing an impairment check on performance of each service, and performing path selection for the newly added service according to a result of the impairment check;

wherein the performing impairment check on performance of each service, and performing path selection for the newly added service according to a result of the impairment check comprises:

determining whether an end-to-end optical signal-to-noise ratio margin corresponding to each service is greater than preset margin tolerance;

when an end-to-end optical signal-to-noise ratio margin corresponding to each service is greater than the preset margin tolerance, using the path obtained by the computation as a path corresponding to the newly added service; and when an end-to-end optical signal-to-noise ratio margin corresponding to at least one service is smaller than the preset margin tolerance, repeating the step of computing an end-to-end path for the newly added service according to the network topology and the wavelength constraint until a path obtained by re-computation satisfies the preset margin tolerance.

7. The method according to claim 1, further comprising:

when optical power of each channel in the physical impairment information changes, re-obtaining updated optical power of each channel, or receiving updated optical power of each channel that is actively sent by each node in the network.

8. A path selecting apparatus, comprising:

a path computation module, configured to compute an end-to-end path for a newly added service according to network topology and a wavelength constraint, and assign a wavelength to the path;

a performance computation module, configured to compute performance of each existing service and performance of the newly added service in a network according to physical impairment information collected in the network, wherein the physical impairment information comprises a gain reference spectrum of each optical amplifier in the network; and an impairment check module, configured to perform impairment check on performance of each service, and perform path selection for the newly added service according to a result of the impairment check; wherein the impairment check module comprises:

a determining unit, configured to determine whether an end-to-end optical signal-to-noise ratio margin corresponding to each service is greater than preset margin tolerance;

a first selection unit, configured to: when an end-to-end optical signal-to-noise ratio margin corresponding to each service is greater than the preset margin tolerance, use the path obtained by the computation as a path corresponding to the newly added service; and a second selection unit, configured to: when an end-to-end optical signal-to-noise ratio margin corresponding to at least one service is smaller than the preset margin tolerance, repeat the computing an end-to-end path for the newly added service according to the network topology and the wavelength constraint until a path obtained by re-computation satisfies the preset margin tolerance.

9. The apparatus according to claim 8, wherein the performance computation module further comprises:

a first computation unit, configured to: according to a measured gain reference spectrum and collected input optical power of each optical amplifier that a path corresponding to each existing service and the newly added service passes, compute an end-to-end optical signal-to-noise ratio value corresponding to each existing service and an end-to-end optical signal-to-noise ratio value corresponding to the newly added service after the new service is added in the network, and use an end-to-end optical signal-to-noise ratio value corresponding to each service as a parameter for evaluating performance of each service.

10. The apparatus according to claim 8, wherein the performance computation module further comprises:

a second computation unit, configured to: according to one or more parameters of a device that a path corresponding to each existing service and the newly added service passes, an optical fiber type, a modulation type of each channel, optical power of each channel, and residual dispersion that are collected, compute an end-to-end optical signal-to-noise ratio penalty corresponding to each existing service and an end-to-end optical signal-to-noise ratio penalty corresponding to the newly added service, and use an end-to-end optical signal-to-noise ratio penalty corresponding to each service as a parameter for evaluating performance of each service.

11. The apparatus according to claim 10, wherein the performance computation module further comprises:

a third computation unit, configured to: according to a preset optical signal-to-noise ratio value needed end to end by a path corresponding to each existing service and the newly added service, an end-to-end optical signal-to-noise ratio value corresponding to each existing service and an end-to-end optical signal-to-noise ratio value corresponding to the newly added service, and an end-to-end optical signal-to-noise ratio penalty corresponding to each existing service and an end-to-end optical signal-to-noise ratio penalty corresponding to the newly added service, compute an end-to-end optical signal-to-noise ratio margin corresponding to each existing service and an end-to-end optical signal-to-noise ratio margin corresponding to the newly added service, and use an end-to-end optical signal-to-noise ratio margin corresponding to each service as a parameter for evaluating performance of each service.

12. The apparatus according to claim 9, wherein the first computation unit comprises:

an obtaining subunit, configured to: according to a measured gain reference spectrum of each optical amplifier that a path corresponding to each existing service and the newly added service passes, obtain respective gains and noise factors of optical amplifiers of each existing service and the newly added service under each input optical power; and a computation subunit, configured to: according to the respective gains and noise factors of the optical amplifiers of each existing service and the newly added service under each input optical power, compute an end-to-end optical signal-to-noise ratio values corresponding to each existing service and an end-to-end optical signal-to-noise ratio value corresponding to the newly added service after the new service is added in the network, wherein input optical power of a first-section optical amplifier corresponding to each existing service is input optical power of the first-section optical amplifier of each existing service before the new service is added in the network, input optical power of a first-section optical amplifier corresponding to the newly added service is a preset optical power value or an average of input optical power of first-section optical amplifiers of the existing services, and input optical power of an optical amplifier of each section is obtained according to output optical power of an optical amplifier of a previous section, attenuation between optical amplifiers of two sections and a Raman effect of an optical fiber between the optical amplifiers of two sections.

* * * * *

UNITED STATES PATENT AND TRADEMARK OFFICE
CERTIFICATE OF CORRECTION

PATENT NO.        : 9,215,029 B2                                            Page 1 of 1
APPLICATION NO.   : 14/087360
DATED             : December 15, 2015
INVENTOR(S)       : Jianrui Han et al.

It is certified that error appears in the above-identified patent and that said Letters Patent is hereby corrected as shown below:

On the Title Page Item (56) (Other Publications), Column 2, Line 7:

Delete "Azodolmolsky" and inset --Azodolmolky--, therefor.

On the Title Page Item (56) (Other Publications), Column 2, Line 7:

After A delete "surcey" and insert --survey--, therefor.

On the Title Page Item (56) (Other Publications), Column 2, Line 18:

Delete "impariments" and insert --impairments--, therefor.

On the Title Page Item (56) (Other Publications), Column 2, Line 20:

Delete "impariments" and insert --impairments--, therefor.

On the Title Page Item (56) (Other Publications), Column 2, Line 21:

Delete "stnadard" and insert --standard--, therefor.

In the Claims

Column 14, Line 50:

Delete "stcp" and insert --step--, therefor.

Signed and Sealed this
Thirty-first Day of May, 2016

Michelle K. Lee
*Director of the United States Patent and Trademark Office*